United States Patent
Shen et al.

(10) Patent No.: US 10,325,114 B2
(45) Date of Patent: Jun. 18, 2019

(54) COMPUTING SYSTEM WITH INFORMATION PRIVACY MECHANISM AND METHOD OF OPERATION THEREOF

(71) Applicant: Samsung Electronics Co., Ltd., Suwon-si, Gyeonggi-Do (KR)

(72) Inventors: Yilin Shen, Sunnyvale, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 14/921,979

(22) Filed: Oct. 23, 2015

(65) Prior Publication Data

US 2016/0117512 A1     Apr. 28, 2016

Related U.S. Application Data

(60) Provisional application No. 62/067,928, filed on Oct. 23, 2014.

(51) Int. Cl.
| | |
|---|---|
| *G06F 21/00* | (2013.01) |
| *H04L 29/06* | (2006.01) |
| *G06F 21/62* | (2013.01) |
| *H04W 12/02* | (2009.01) |

(52) U.S. Cl.
CPC ............................... *G06F 21/6263* (2013.01)

(58) Field of Classification Search
CPC .................................................. G06F 21/6263
See application file for complete search history.

(56) References Cited

U.S. PATENT DOCUMENTS

| | | | |
|---|---|---|---|
| 8,619,984 B2 | 12/2013 | McSherry et al. | |
| 2009/0254971 A1* | 10/2009 | Herz | G06Q 10/10 726/1 |
| 2014/0013438 A1* | 1/2014 | Minamizawa | G06Q 10/10 726/26 |

(Continued)

FOREIGN PATENT DOCUMENTS

EP     3340101 A1 *   6/2018   ......... G06F 21/6254

OTHER PUBLICATIONS

Haimonti Dutta, Hillol Kargupta, Souptik Datta, Krishnamoorthy Sivakumar; "Analysis of privacy preserving random perturbation techniques: further explorations"; Oct. 2003; WPES '03: Proceedings of the 2003 ACM workshop on Privacy in the electronic society; pp. 31-38 (Year: 2003).*

(Continued)

*Primary Examiner* — Kendall Dolly
*Assistant Examiner* — Courtney D Fields

(57) ABSTRACT

A computing system includes: a control unit configured to: obtain an information release setting for a raw user information, the raw user information including an information attribute; determine an information format for the information attribute of the raw user information; determine a privacy notion based on the information release setting; generate perturbed user information from the information attribute based on the privacy notion, wherein the information format for the raw user information is preserved in the perturbed user information; and a communication unit, coupled to the control unit, configured to transmit the perturbed user information.

20 Claims, 8 Drawing Sheets

(56) References Cited

U.S. PATENT DOCUMENTS

2014/0040172 A1* 2/2014 Ling ................ G06N 5/022
706/12
2015/0154646 A1 6/2015 Mishra et al.

OTHER PUBLICATIONS

Nissim et al. "Calibrating Noise to Sensitivity in Private Data Analysis".

Frank McSherry and Ilya Mironov. 2009. Differentially private recommender systems: building privacy into the net. In Proceedings of the 15th ACM SIGKDD international conference on Knowledge discovery and data mining (KDD '09). ACM, New York, NY, USA, 627-636.

Polat, H.; Wenliang Du, "Privacy-preserving collaborative filtering using randomized perturbation techniques," Data Mining, 2003. ICDM 2003. Third IEEE International Conference on , vol., No., pp. 625,628, Nov. 19-22, 2003.

Valeria Nikolaenko, Stratis Ioannidis, Udi Weinsberg, Marc Joye, Nina Taft, and Dan Boneh. 2013. Privacy-preserving matrix factorization. In Proceedings of the 2013 ACM SIGSAC conference on Computer & communications security. (CCS '13). ACM, New York, NY, USA, 801-812.

Canny, John, "Collaborative filtering with privacy," Security and Privacy, 2002. Proceedings. 2002 IEEE Symposium on , vol., No., pp. 45,57, 2002.

\* cited by examiner

COMPUTING SYSTEM WITH INFORMATION PRIVACY MECHANISM AND METHOD OF OPERATION THEREOF

CROSS-REFERENCE TO RELATED APPLICATION(S)

This application claims the benefit of U.S. Provisional Patent Application Ser. No. 62/067,928 filed Oct. 23, 2014, and the subject matter thereof is incorporated herein by reference thereto.

TECHNICAL FIELD

An embodiment of the present invention relates generally to a computing system, and more particularly to a system for information privacy.

BACKGROUND

Modern consumer and industrial electronics, especially devices such as televisions, smart phones, cellular phones, portable digital assistants, tablet computers, laptop computers, and combination devices, are providing increasing levels of functionality to support modern life including the protection of private information for the device users. Research and development in the existing technologies can take a myriad of different directions.

As more systems become more reliant on services external to the user's device for analysis and handling of a user's information, such as recommendations to a user base on a user's historical data, the risk of theft or attacks on the user's information become a greater threat. Furthermore, additional measures are needed to provide security for transmitting a user's personal, private, or sensitive information to systems, servers, services, or a combination thereof external to the user's device.

Thus, a need still remains for a computing system with an information privacy mechanism to protect a user's information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a control unit configured to: obtain an information release setting for a raw user information, the raw user information including an information attribute; determine an information format for the information attribute of the raw user information; determine a privacy notion based on the information release setting; generate perturbed user information from the information attribute based on the privacy notion, wherein the information format for the raw user information is preserved in the perturbed user information; and a communication unit, coupled to the control unit, configured to transmit the perturbed user information.

An embodiment of the present invention provides obtaining an information release setting for a raw user information, the raw user information including an information attribute; determining an information format for the information attribute of the raw user information; determining a privacy notion based on the privacy setting; generating perturbed user information from the information attribute based on the privacy notion, wherein the information format for the raw user information is preserved in the perturbed user information.

An embodiment of the present invention provides a non-transitory computer readable medium including instructions executable by a control circuit for a computing system, the instructions comprising: obtaining an information release setting for a raw user information, the raw user information including an information attribute; determining an information format for the information attribute of the raw user information; determining a privacy notion based on the privacy setting; generating perturbed user information from the information attribute based on the privacy notion, wherein the information format for the raw user information is preserved in the perturbed user information.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
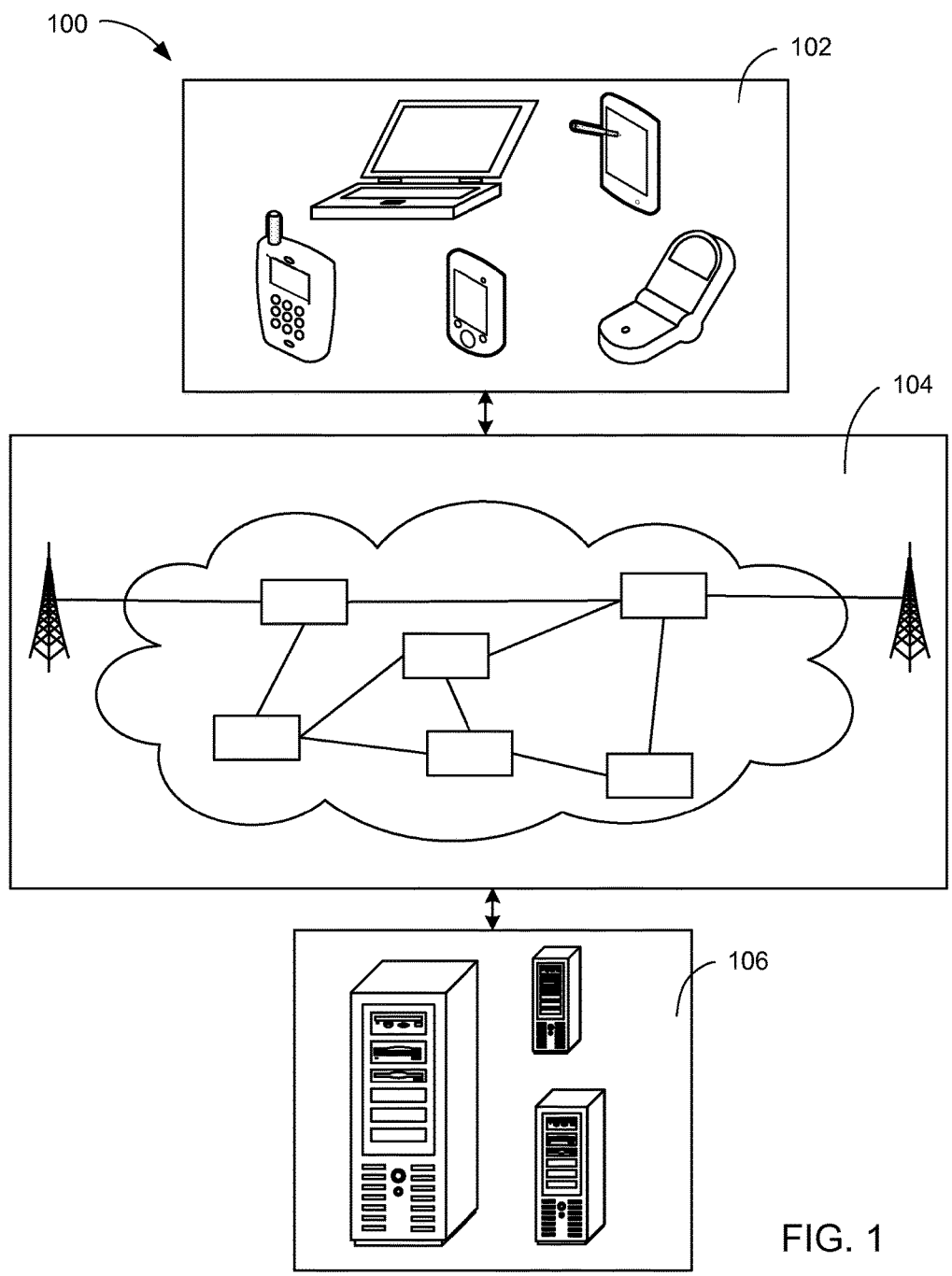
FIG. 1 is a computing system with information privacy mechanism in an embodiment of the present invention.

An embodiment of the present invention provides generating the perturbed user information from the raw user information eliminates the need for encryption or other security measure to protect the raw user information. The perturbed user information has been generated to be maximally different from the raw user information but preserve sufficient correlation to provide accurate recommendations and analysis based on the privacy release policy, which eliminates the need for additional security or protective measures, such as encryption.

A further embodiment of the present invention provides that the method of collaborative filtering based on matrix factorization can be implemented in the absence of additional user information based on the public category factor and the user category factor. Since the latent factors for matrix factorization correlate closely with category information, such as the public category factor and the user category factor, the computing system can generate the perturbed user information to resemble public information based on the product of the public category factor and the user category factor.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

Referring now to FIG. 1, therein is shown a computing system 100 with information privacy mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a cellular phone, a smart phone, a notebook computer, a tablet computer. The first device 102 can couple, either directly or indirectly, to the communication path 104 to communicate with the second device 106 or can be a stand-alone device.

The second device 106 can be any of a variety of centralized or decentralized computing devices. For example, the second device 106 can be a laptop computer, a desktop computer, grid-computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
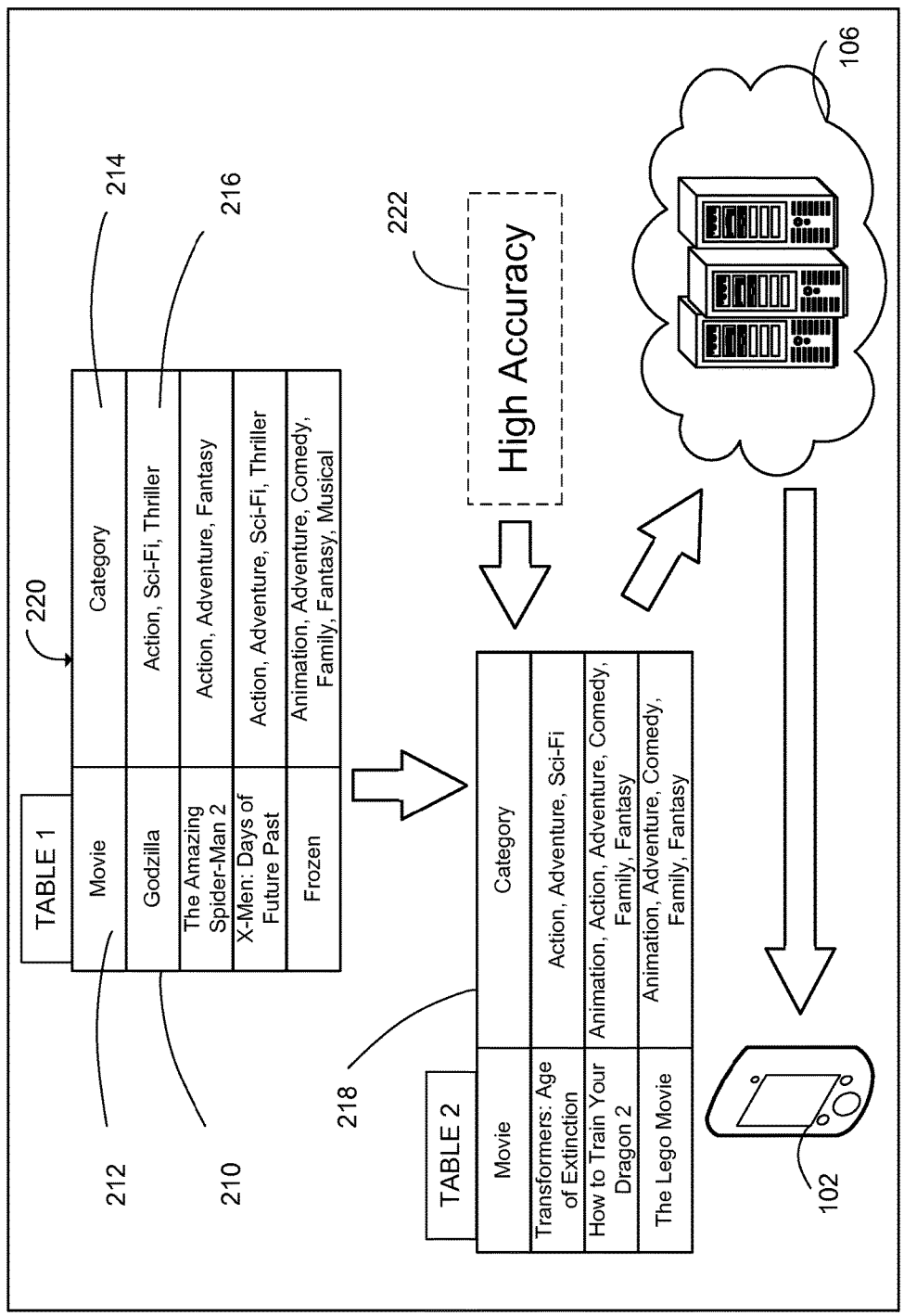
FIG. 2 is an example of the first device in communication with the second device of the computing system.

Referring now to FIG. 2, therein is shown an example of the first device 102 in communication with the second device 106 of the computing system 100. In this example, the first device 102 is depicted as a mobile device, such as a smart phone, although it is understood that the first device 102 can be other electronic devices, such as a television, desktop computer, laptop computer, or tablet computer.

The first device 102 can store raw user information 210 grouped under an information classification 212. The raw user information 210 is information associated with or about the user or owner of the first device 102. The raw user information 210 can include personal information about the user. For example, the raw user information 210 can include the name of a movie watched or item purchased by the user; recorded medical or health sensor reading, such as heart rate or blood pressure measurements; or the name or coordinates of a visited location. For brevity, the user hereinafter refers to the user or owner of the first device 102.

The raw user information 210 can be information about the user that has not been altered or changed by the first device 102, such as information that has not been encrypted or protected with an encryption program. As a specific example, the raw user information 210 can be unmodified information that has been input by the user or gathered by the first device 102.

The information classification 212 defines or identifies the raw user information 210. For example, the information classification 212 for the raw user information 210 can be movies, items purchased, sensor information, locations visited.

For illustrative purposes, this example will depict the information classification 212 as movies viewed by the user and the raw user information 210 as the names of movies. It is understood that the information classification 212 and associated raw user information 210 can be any of those described above.

The raw user information 210 can include information attributes 216 of an attribute category 214. The attribute category 214 is a classification of an attribute or a characteristic. Examples of the attribute category 214 can include the genre or user ratings for media, such as moves, music, or television programs; item type or classification; sensor type, location types.

The information attributes 216 are descriptions or characterizations of the raw user information 210 for a given type of the attribute category 214. For example, the information attributes 216 can be a specific property or characterization of the raw user information 210. The raw user information 210 can include one or more of the information attributes 216 for a given instance of the attribute category 214. In a specific example, for the raw user information 210 including "McDonalds," the attribute category 214 can be "locations" and the information attributes 216 can include "restaurant," "fast food," "American food," "hamburgers," or other attributes or descriptions of "McDonalds."

Table 1 is an example of the raw user information 210, the information classification 212, the information attributes 216, and the attribute category 214. In this example, the information classification 212 can be "recently watched movies" and the set of the raw user information 210 can be the list of movies watched by the user, such as "Godzilla," "The Amazing Spider-Man 2," "X-men: Days of Future Past," and "Frozen." The attribute category 214 is represented as the movie genre and the information attributes 216 are represented as the specific genres types associated with the movie. For instance, the raw user information 210 of "Godzilla" includes the information attributes 216 of "Action," "Sci-Fi," and "Thriller."

For illustrative purposes, Table 1 depicts the raw user information 210 having one instance of the attribute category 214, although it is understood that the raw user information 210 can include more than one of the attribute category 214. For example of movies, the raw user information 210 can include the attribute category 214 of "user ratings" or "number of times viewed by the user."

The computing system 100 can enable protection of the raw user information 210 by converting the raw user information 210 and associated instances of the information attributes 216 to perturbed user information 218. The perturbed user information 218 is the raw user information 210 that has been anonymized to resemble the information of a generic user or public user rather than device user. For example, the computing system 100 can generate the perturbed user information 218 by preserving trends in the raw user information 210, the information attributes 216, or a combination thereof while modifying, adding, or removing instances of the raw user information 210 and associated instances of the information attributes 216. As a specific example, random noise can be added to the raw user information 210, the information attributes 216, or a combination thereof, which can maintain properties of the raw user information 210 while randomly altering exact content of the raw user information 210. The functions associated with generating the perturbed user information 218 will be discussed below.

The raw user information 210 can be modified in a number of ways to generate the perturbed user information 218. Table 2 is an example of the perturbed user information 218 generated from the raw user information 210 of Table 1. As illustrated in Table 2, the number of entries in the perturbed user information 218 can be modified from four entries for the raw user information 210 to three entries. Further, the content of the raw user information 210 can be changed, such as changing the name of the movie viewed by the user. Yet further, the information attributes 216 and the number of the information attributes 216 associated with the raw user information 210 can be changed.

In this example illustrated in Table 2, the perturbed user information 218 is generated to preserve the trend of movie genres in the raw user information 210 even though the content of the raw user information 210, which are the names of actual movies watched, and the associated instances of the information attributes 216 have been changed. Furthermore, the perturbed user information 218 can be generated to preserve an information format 220 for the raw user information 210.

The information format 220 is the structure of the raw user information 210 and the perturbed user information 218. The information format 220 can be based on the information classification 212 and the attribute category 214. For example, the information format 220 for the raw user information 210 can include the raw user information 210 for a particular type of the information classification 212 that is associated with the information attributes 216 of a particular type of the attribute category 214. In the example of Table 1, the information format 220 can include the information classification 212 of movies that are associated with the attribute category 214 of movie genres. To continue the example, the perturbed user information 218 of Table 2 includes modifications to the raw user information 210 and the associated instances of the information attributes 216. However, the information classification 212 of movies and the attribute category 214 of movie genres were preserved in generating the user perturbed user information 218.

The first device 102 can transmit the raw user information 210, the perturbed user information 218, or a combination thereof to the second device 106. For example, the first device 102 can transmit the raw user information 210, the perturbed user information 218, or a combination thereof through the communication channel 104. In this example, the second device 106 is depicted as a recommendation service device. The second device 106 can receive the raw user information 210, the perturbed user information 218, or a combination thereof and perform further analysis without further unscrambling or decryption. For example, the second device 106 can provide recommendations for other movies that the user may prefer based on the perturbed user information 218.

The computing system 100 can include the option of an information utility setting 222, as depicted by the dashed box, for generation and release of the perturbed user information 218. The information utility setting 222 is a setting that constrains the degree of modification to the raw user information 210 for generation of the perturbed user information 218. More specifically, the information utility setting 222 can be a constraint based on the quality or degree of accuracy for results generated from analysis or processing of the perturbed user information 218. Analysis or processing of the perturbed user information 218, for example, can include the generation of recommendation for other movies based on the perturbed user information 218 or analysis of medical sensor readings.

In the example of the above movie recommendation service, the information utility setting 222 can be a setting for the accuracy of recommendations generated based on the perturbed user information. In general, a higher degree of recommendation accuracy for the information utility setting 222 will constrain the generation of the perturbed user information 218 such that the differences between the perturbed user information 218 and the raw user information 210 are smaller relative to the differences when a lower degree of recommendation accuracy is configured for the information utility setting 222. More specifically, the perturbed user information 218 can have a higher resemblance to the raw user information 210 for settings of higher recommendation accuracy of the information utility setting 222.

In this implementation of the invention, the computing system 100 can generate the perturbed user information 218 on the first device 102. More specifically, the perturbed user information 218 is generated solely on the first device 102.

Figure 3:
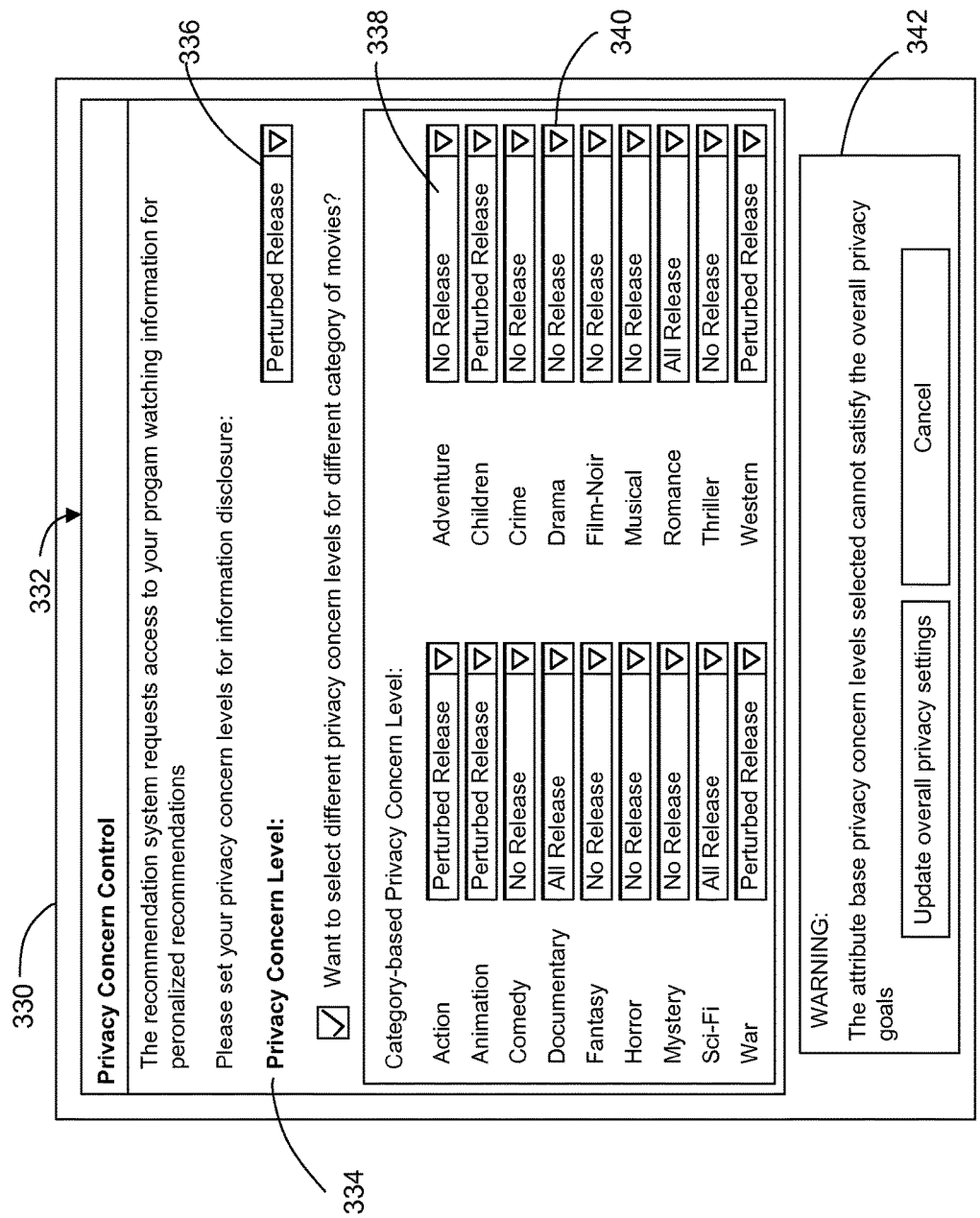
FIG. 3 is an example of a display interface of the first device of FIG. 1.

Referring now to FIG. 3, therein is shown an example of a display interface 330 of the first device 102 of FIG. 1. The display interface 330 depicts a privacy control interface 332. The privacy control interface 332 is an interface that enables the user to select the privacy protection level for information associated with the user. More specifically, the privacy control interface 332 can enable the user to control the amount of privacy that is preserved when sharing the raw user information 210, the perturbed user information 218 of FIG. 2, or a combination thereof with another device, such as the second device 106 of FIG. 2, for receiving recommendations based on the raw user information 210 of FIG. 2, the perturbed user information 218 of FIG. 2, or a combination thereof.

For illustrative purposes, the device interface 330 depicts the privacy control interface 332 for receiving a movie recommendation service, although it is understood that the privacy control interface 332 can be adapted for privacy control for other types of the raw user information 210, such as medical records, online purchases, or locations visited.

In this example, the privacy control interface 332 can enable the user to select an information release setting 334 for the raw user information 210 related to providing recommendations of movie viewing. The privacy control interface 332 can provide an information release setting 334, which is the level of security or privacy used to protect the raw user information.

The privacy release setting 334 can include the option for an overall privacy setting 336, which is a general privacy setting that is applied to all of the raw user information 210 to be released from the first device 102. Optionally, the privacy release setting 334 can include attribute based privacy settings 338, which are privacy settings for individual instances of the information attributes 216. For example, the user can have the option to set the attribute based privacy settings 338 at different levels for different instances of the attribute based privacy settings 338. In another example, the overall privacy setting 336 can be selected in combination with the attribute based privacy settings 338, which can differ or allow exceptions for specific instances of the information attributes 216.

The level of privacy settings are determined by a privacy release policy 340 for the overall privacy setting 336, the attribute based privacy settings 338 or a combination thereof. The privacy release policy 340 is the degree or levels of privacy that will be used to protect the information. The computing system 100 can generate the perturbed user information 218 from the raw user information 210 based on the privacy release policy 340, which will be described in detail below.

As an example, the privacy release policy 340 can include the options of "full release," "no release," or "perturbed release." The privacy release policy 340 of "full release" enables unmodified release of the raw user information 210, or release of the raw user information 210 without the application of protective measures. The privacy release policy 340 of "perturbed release" enables the computing system 100 to release perturbed user information 218 based on the raw user information 210.

The privacy release policy 340 of "no release" will prevent the computing system 100 from releasing the raw user information 210. For example, when the privacy release policy 340 of "no release" is set as the attribute based privacy settings 338 for one or more instances of the information attributes 216, the computing system 100 will prevent the release of any of the raw user information 210 that includes those particular instances of the information attributes 216.

Optionally, the computing system 100 can present a protection failure notification 342, such as a pop-up window, on the display interface 330. For example, the protection failure notification 342 can include information stating that the computing system 100 cannot protect the raw user information 210 based on the privacy release policy 340 information release setting selected for overall privacy setting 336, the attribute based privacy setting 338, or a combination thereof.

Figure 4:
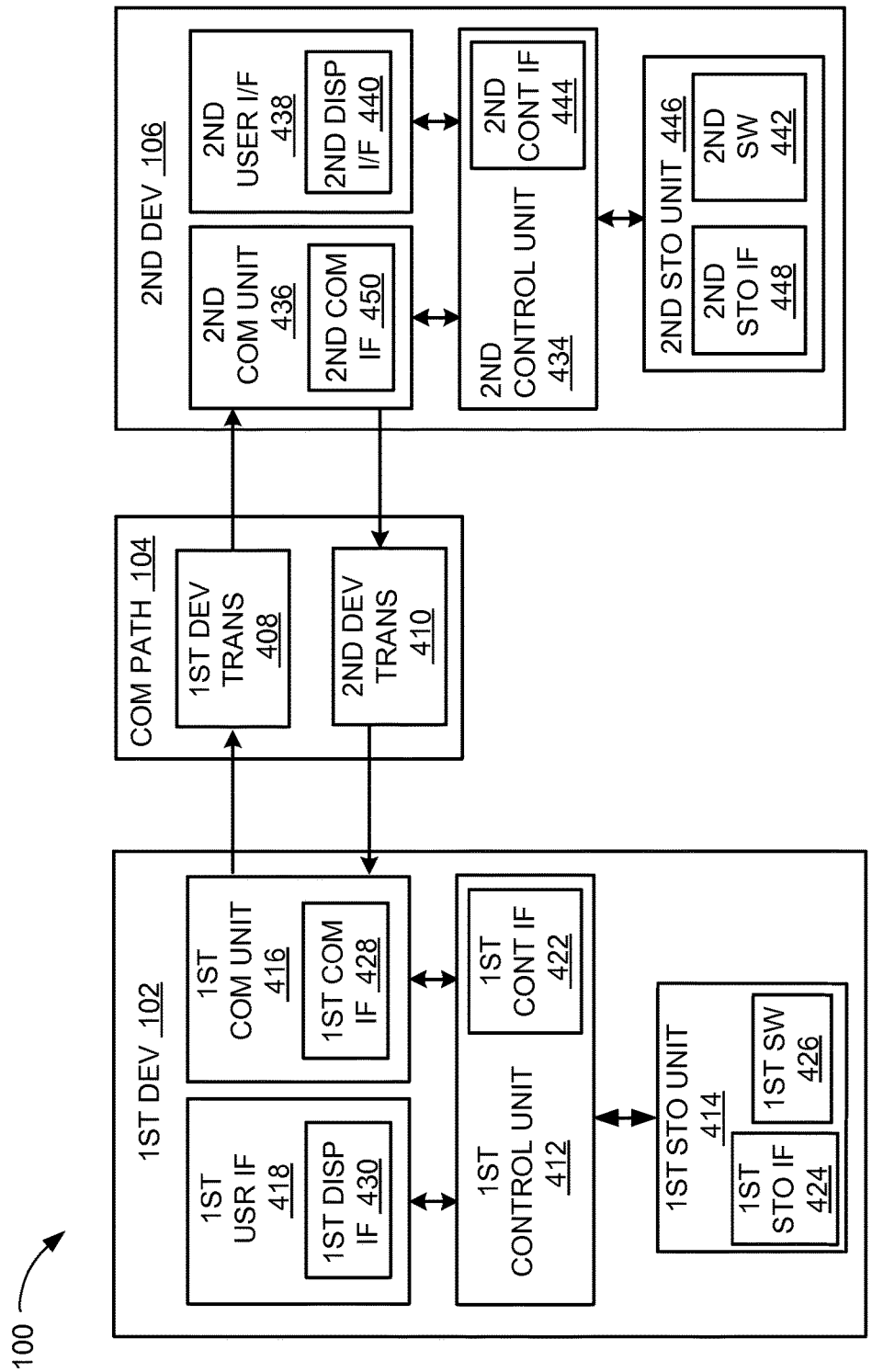
FIG. 4 is an exemplary block diagram of the computing system.

Referring now to FIG. 4, therein is shown an exemplary block diagram of the computing system 100. The computing system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418. The first control unit 412 can include a first control interface 422. The first control unit 412 can execute a first software 426 to provide the intelligence of the computing system 100.

The first control unit 412 can be implemented in a number of different manners. For example, the first control unit 412 can be a processor, an application specific integrated circuit (ASIC), an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as the raw user information 210 of FIG. 2, the overall privacy setting 336 of FIG. 3 for information release setting 334 of FIG. 3 associated information attributes 216 of FIG. 2, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the computing system 100. The first control unit 412 can also execute the first software 426 for the other functions of the computing system 100. The first control unit 412 can further execute the first software 426 for interaction with the communication path 104 via the first communication unit 416.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the computing system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computing system 100, including operating the second communication unit 436 to communicate with the first device 102 over the communication path 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

The second storage unit 446 can store the second software 442. For example, the second storage unit 446 can also store the relevant information, such as the raw user information 210 of FIG. 2.

For illustrative purposes, the second storage unit 446 is shown as a single element, although it is understood that the second storage unit 446 can be a distribution of storage elements. Also for illustrative purposes, the computing system 100 is shown with the second storage unit 446 as a single hierarchy storage system, although it is understood that the computing system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The computing system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the functions of the computing system 100.

Figure 5:
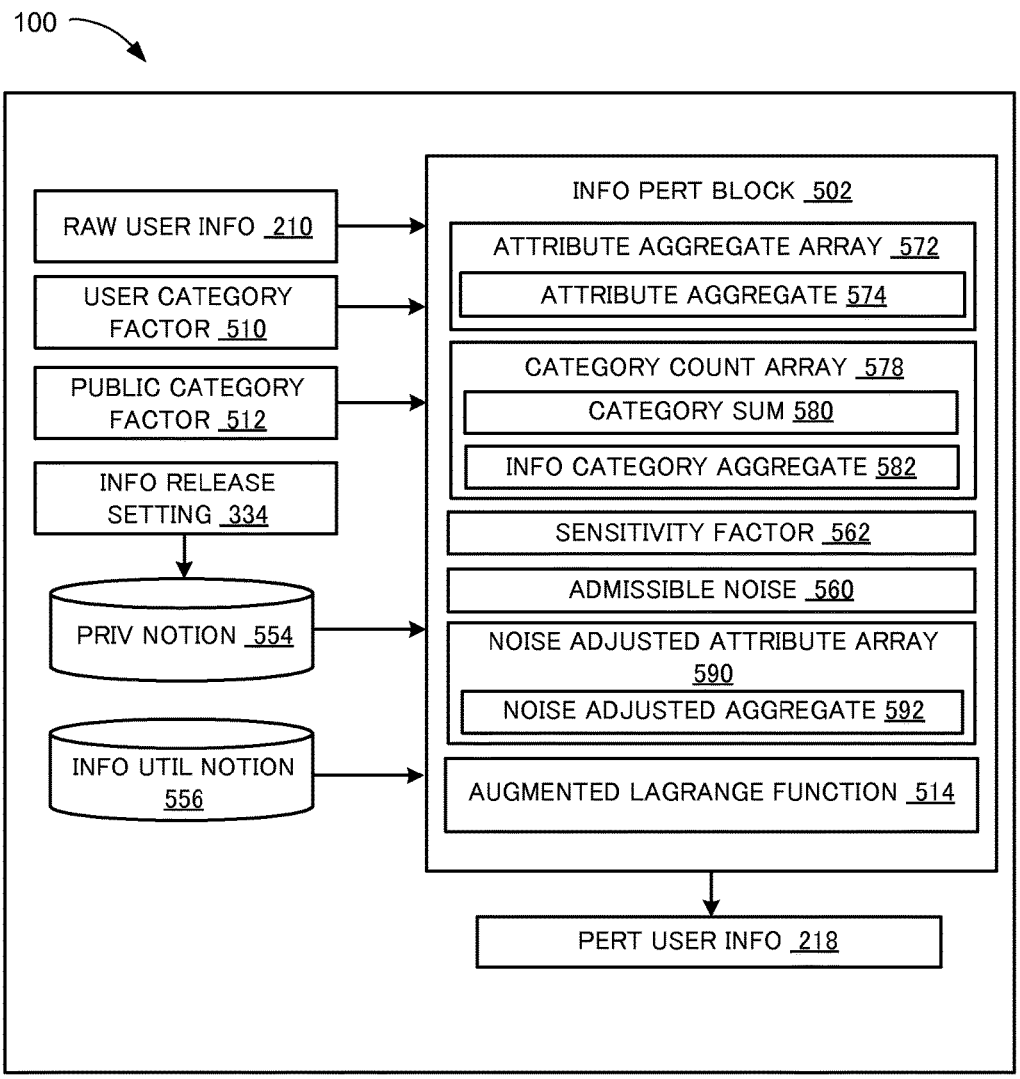
FIG. 5 is an exemplary architecture diagram for the computing system of FIG. 1.

Referring now to FIG. 5, therein is shown an exemplary architecture diagram for the computing system 100 of FIG. 1. The architecture diagram depicts the system components for generating the perturbed user information 218 in an information perturbation block 502. For example, inputs to the information perturbation block 502 can include: the raw user information 210, a user category factor 510, a public category factor 512, a privacy notion 554 based on the information release setting 334, an information utility notion 556, or a combination thereof. The inputs to the information perturbation block 502 will be discussed in detail below.

As a further example, the components and functions of the information perturbation block 510 for generating the perturbed user information 218 can include: an attribute aggregate 574 in an attribute aggregate array 572; a category sum 580 and information category aggregate 582, both in a category count array 578; a sensitivity factor 562, an admissible noise 560; a noise adjusted aggregate 592 in a noise adjusted attribute array 590; an augmented lagrangian function 514, or a combination thereof. The details for implementation of the components and functions of the architecture diagram for generating the perturbed user information 218 will be described below.

Figure 6:
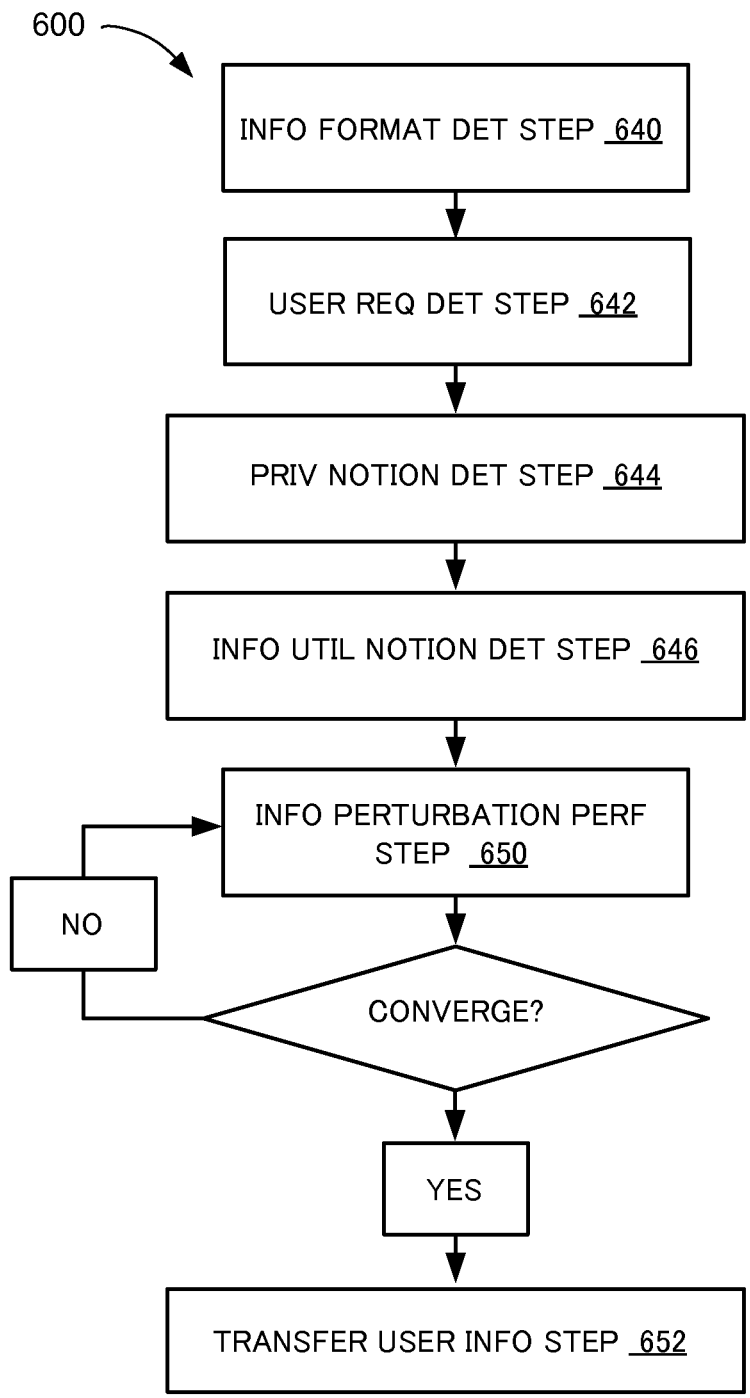
FIG. 6 is an exemplary flow chart representing the computing system of FIG. 1.

Referring now to FIG. 6, therein is shown an exemplary flow chart 600 representing the operation of the computing system 100 of FIG. 1. The computing system 100 can utilize one or more of the user interfaces, communication circuits, control circuits, location circuits, storage circuits, or a combination thereof as illustrated in FIG. 4 and described above to implement one or more functions, instructions, steps, or a combination thereof described below.

For example, the computing system 100 can use the first user interface 418 of FIG. 4, the second user interface 438 of FIG. 4, the first communication circuit 416 of FIG. 4, the second communication circuit 436 of FIG. 4, the first control circuit 412 of FIG. 4, the second control circuit 434 of FIG. 4, the first storage unit 414 of FIG. 4, the second storage unit 446 of FIG. 4, or a combination thereof to implement the first software 426 of FIG. 4, the second software 442 of FIG. 4, or a combination thereof. The first software 426, the second software 442, or a combination thereof can include the functions, the instructions, the steps, or a combination thereof described below.

The computing system 100 can perform the functions, the instructions, the steps, or a combination thereof for determining information format, determining user requirements, determining a privacy notion, determining an information utility notion, performing information perturbation, and transmitting user information.

An information format determination step 640 is for determining the information format 220 of FIG. 2 for the raw user information 210 of FIG. 2. For example, the computing system 100 can determine the information format 220 based on the information classification 212 of FIG. 2 for the raw user information 210 and the attribute category 214 of FIG. 2 for the information attributes 216 of FIG. 2. In one example, the information format 220 can be given as a template with the information classification 212 and the attribute category 214 provided. In another example, the first control unit 412 can parse the raw user information 210 to determine the information classification 212 based on similarities between instances of the raw user information 210. Similarly, the first control unit 412 can parse the information attributes 216 associated with each of the raw user information 210 to determine the attribute category 214.

A user requirement determination step 642 is for determining the preferences for protection of the raw user information 210. In the user requirement determination step 642, the computing system 100 can obtain the information release setting 334 of FIG. 3 for the raw user information 210, which can include the overall privacy setting 336 of FIG. 3, the categorical privacy setting 338 of FIG. 3, or a combination thereof. In one example, the user can input the information release setting 334 for the raw user information 210 through the privacy control interface 332 of FIG. 2, which can be displayed on the first user interface 418 of FIG. 4. In another example, the first control unit 412 can communicate with the first storage unit 414 of FIG. 4, the second storage unit 446 of FIG. 4, or a combination thereof to obtain the information release setting 334 that have been previously stored. As a specific example, the information release setting 334 for the raw user information 210 that have been previously stored can include a system default or factory setting, such as a non-alterable setting for the information release setting 334. Optionally, the computing system 100 can also obtain the information utility setting 222 of FIG. 2 through the first user interface 418 or the first storage unit 414.

A privacy notion determination step 644 is for determining the privacy notion 554 of FIG. 5 associated with the information release setting 334. The privacy notion 554 is the mechanism or model applied to the raw user information 210 for generating the perturbed user information 218 of FIG. 2. For example, the first control unit 412 can determine the privacy notion 554 as differential privacy based method, information gain based method, or mutual information based method An information utility notion determination step 646 is for determining the information utility notion 556 of FIG. 5 based on the user input or system default and factors associated with the raw user information 210 as indicated by the information utility setting 222. The information utility notion 556 can be constraints on generation of the perturbed user information 218 for the purpose of setting the range of accuracy for analysis of the perturbed user information 218 relative to the raw user information 210. For example, the information utility notion 556 can include methods based on collaborative filtering, root mean square error, mean absolute error, or top-k recommendation. As an example, the first control unit 412 can determine the information utility notion 556 based on analysis of factors associated with the raw user information 210, such as metadata and histograms. Determination of the information utility notion 556 can be optional.

An information perturbation performance step 650 is for generating the perturbed user information 218 from the raw user information 210. In general, the information perturbation step 650 can include a noise calibration phase and an information sanitization phase, which will be discussed in detail below.

The computing system 100 can iterate through the information perturbation step 650 to determine convergence for the perturbed user information 218 with the first control unit 412. When convergence is determined, the first control unit 412 can generate the perturbed user information 218 and communicate with the first display interface 330 of FIG. 4 for displaying the perturbed user information 218. Alternatively, when the computing system 100 determines that no solution exists due to non-convergence, the computing system 100 can provide a notification, such as the protection failure notification 342 of FIG. 3 to the user indicating that the perturbed user information 218 could not be generated based on the information release setting 334, the information utility setting 222 or a combination thereof. The first control unit 412 can also communicate with the first storage unit 414 to store the perturbed user information 218 for subsequent processing.

The information transmission step 652 is for transmission of the perturbed user information 218. In the information transmission step 652, the computing system 100 can transmit the perturbed user information 218 to a device or entity external to the first device 102. For example, the computing system 100 can interface with the first communication unit 416 of FIG. 4 to transmit the perturbed user information 218 to the second device 106 of FIG. 1 for processing of the perturbed user information 218. As a specific example, the first control unit 412 can interface with the first communication unit 416 of FIG. 4 to transmit the perturbed user information 218 related to movies to the recommendation system of the second device 106, as illustrated in FIG. 2.

The steps described in this disclosure can be implemented as instructions stored on a non-transitory computer readable medium to be executed by a first control unit 412, the second control unit 436, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

The physical transformation from receiving recommendations based on the perturbed user information 218 results in the movement in the physical world, such as the user interacting with the first device 102 to make a selection based on the recommendation. Movement in the physical world results in generation of new instances of the raw user information 210.

Figure 7:
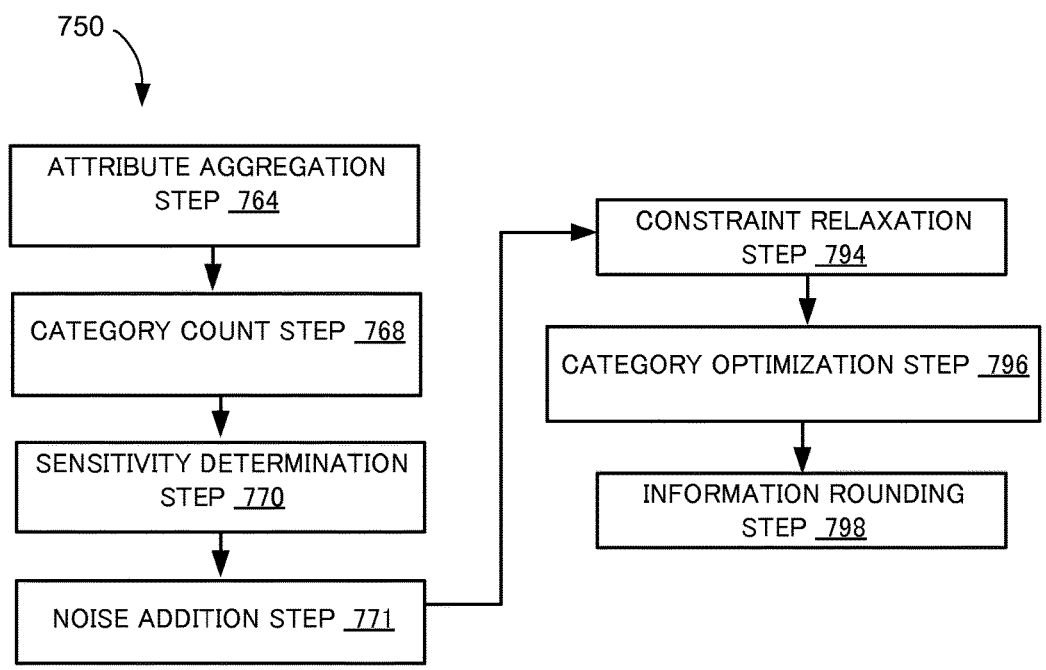
FIG. 7 is the information perturbation step of FIG. 6.

Referring now to FIG. 7, therein is shown the information perturbation step 650 of FIG. 6. As described above, the first control unit 412 can generate the perturbed user information 218 of FIG. 2 from the raw user information 210 of FIG. 2. As an example, this implementation of the information perturbation step 650 is based on the privacy notion 554 of FIG. 5 of differential privacy. However, it is understood that the information perturbation step 650 can generate the perturbed user information 218 based on different methods of the privacy notion 554, such as mutual information.

In general, the information perturbation step 650 can include a noise calibration phase and an information sanitization phase. The noise calibration phase is for determining the magnitude of the admissible noise 560 of FIG. 5 for the perturbed user information 218. The admissible noise 560 can be calculated with an admissible noise function according to Equation 1 as follows:

$$NC(D_r)=f(D_r)+\Delta f_L^*(D_r,\beta)Z/\alpha \quad \text{Eq. 1}$$

Where $NC(D_r)$ represents the admissible noise 560, $D_r$ is a value associated with the raw user information 210, $\Delta f_L^*(D_r,\beta)$ represents the sensitivity factor 562 of FIG. 5, Z represents the noise distribution factor, and $\alpha$ and $\beta$ represents noise distribution modifiers. For example, the noise distribution modifiers can be determined as privacy budgets based on the information release setting 334 of FIG. 3. The sensitivity factor 562 can be based on the difference between an adjacent pair of information in a set of information.

In the noise calibration phase, the first control unit 412 of FIG. 4 can calculate the admissible noise 560 according to Eq. 1 above in an attribute aggregation step 764, a category counting step 768, a sensitivity determination step 770, and a noise addition step 771.

The attribute aggregation step 764 is for generating the attribute aggregate array 572 of FIG. 5. The attribute aggregate array 572 is an array that contains correlations between an instance of the information attribute 216 of FIG. 2 and the number of the raw user information 210 of FIG. 2 that is associated with the particular instance of the information attribute 216. For example, an entry in the attribute aggregate array 572 can include the attribute aggregate 574 of FIG. 5 for each of the information attributes 216 that appear in the set of the information attribute 216.

The attribute aggregate 574 is the number of times that the raw user information 210 includes a particular instance of the information attributes 216. For example, if three of the movies include the information attributes 216 of "action," then the attribute aggregate 574 corresponding with "action" can be determined as 3. The first control unit 412 can iterate through each instance of the raw user information 210 to generate the attribute aggregate array 572.

The category count step 768 is for generating the category count array 578 of FIG. 5. The category count array 578 is an array that contains correlations between the total number of instances that each of a particular type of the information attributes 216 is correlated with one of the raw user information 210. For example, each entry in the category count array 578 can include the information category aggregate 582 of FIG. 5 associated with the category sum 580 of FIG. 5.

The category sum 580 is the total number of the information attributes 216 that are associated with a particular instance of the raw user information 210. As an example, the first control unit 412 can calculate the category sum 580 as "three" for one of the raw user information 210 that include three different or unique instances of the information attributes 216. As a specific example, referring to TABLE 1 of FIG. 2, the category sum 580 for the raw user information 210 of "Godzilla" can be calculate by the first control unit 412 as "three" since "Godzilla" includes the information attributes 216 of "action," "sci-fi," and "thriller."

The information category aggregate 582 is the number of the raw user information 210 that matches a particular instance of the category sum 580. For example, referring again to TABLE 1 of FIG. 2, since two movies, "Godzilla" and "The Amazing Spider-Man 2" each includes three of the information attributes 216, the first control unit 412 can calculate the information category aggregate 582 as "two" for the category sum 580 having the value of "three." The first control unit 412 can generate the category count array 578 through iteration of the raw user information 210.

The first control unit 412 can calculate the sensitivity factor 562 based on the category count array 578. For example, in the sensitivity determination step 770, the first control unit 412 can calculate the sensitivity factor 562 based on a sensitivity function according to Equation 2 as follows:

$$\Delta f_L^*(D_r,\beta)=\max_{D'}(\Delta f_L(D')^*\exp(-\beta^*d(D,D'))) \quad \text{Eq. 2}$$

Where D' represents the category sum 580 and D' represents the information category aggregate 582, both of the category count array 578.

The first control unit 412 can determine the sensitivity factor 562 based on iteration through the category count array 578. For example, the first control unit 412 can determine the sensitivity factor 562 as the maximum value amongst those calculated with the category count array 578.

The noise addition step 771 is for calculating noise adjusted values as precursors for generating the perturbed user information 218. In the noise addition step 771, the first control unit 412 can generate the noise adjusted attribute array 590 of FIG. 5 from the attribute aggregate array 572 and the sensitivity factor 562 with Equation 1, above. The noise adjusted attribute array 590 can include the noise adjusted aggregate 592 of FIG. 5, which are the attribute aggregate 574 that have been adjusted based on the admissible noise 560. The noise adjusted aggregate 592 can be further modified in the information sanitization phase to generate the perturbed user information 218. In addition, the noise addition step 771 can calculate the admissible noise 560 according to Equation 1 with the values determined for the sensitivity factor 562.

The information sanitization phase can be implemented to generate the perturbed user information 218 based on the admissible noise 560 calculated in the noise calibration phase. In the information sanitization phase, the computing system 100 can generate the perturbed user information 218 with a constraint relaxation step 794, a category optimization step 796, and an information rounding step 798.

In general, the perturbed user information 218 can be generated based on values that provide the maximum distance from the raw user information 210 in accordance with a user privacy concern based on the information release settings of FIG. 3. This relationship can be illustrated in Equation 3 as follows:

$$\max \frac{1}{2} \|W(d_p - d_r)\|_2^2 \qquad \text{Eq. 3}$$

Where "W" represents the user privacy concern factor, "$d_r$" represents the perturbed user information 218, and "$d_r$" represents the raw user information 210. As an example, the user privacy concern factor can be a matrix with weights that can be applied to the raw user information 210.

In addition, calculation of the perturbed user information 218 can include the constraints of Equation 4 and Equation 5, below:

$$\overline{NC} - v_l \leq C^T d_p \leq \overline{NC} + v_r \qquad \text{Eq. 4}$$

Equation 4 represents the constraints based on the admissible noise 560, NC, where $v_l$ and $V_r$ represent noise parametric factors, $\overline{NC}$ represents the average admissible noise 560 as calculated in the noise calibration phase above, and C represents the public category factor 512 of FIG. 5. The public category factor 512 is a representation of the publicly available information for determining the degree of similarity between the perturbed user information 218 and the public information.

$$d_p = C d_c \in \{0,1\}^n \qquad \text{Eq. 5}$$

Equation 5 provides a definition for the perturbed user information 218 based on a collaborative filtering matrix factorization, where $d_c$ represents the user category factor 510 of FIG. 5. The user category factor 510 is a factor that representations the different types of the information attributes 216 for the set of the raw user information 210.

It has been discovered that the method of collaborative filtering based on matrix factorization can be implemented in the absence of additional user information based on the public category factor 512 and the user category factor 510. Since the latent factors for matrix factorization correlate closely with category information, such as the public category factor 512 and the user category factor 510, the computing system 100 can generate the perturbed user information 218 to resemble public information based on the product of the public category factor 512 and the user category factor 510.

The constraint relaxation step 794 is for relaxing the constraints associated for calculation of the optimum values for the perturbed user information 218. In the constraint relaxation step 794, the first control unit 412 can relax the constraints of equation 4 and 5 above to calculate the user category factor 510. For example, the constraints for the noise parametric factors, $v_l$ and $v_r$, can be redefined according to Equation 6 as follows:

$$\|v_l + v_r\|_1 \leq \frac{1}{2} \gamma \Delta f_L^* \qquad \text{Eq. 6}$$

Where "γ" represents the utility notion constraint associated with the information utility notion 556 of FIG. 5 and $\Delta f_L^*$ represents the sensitivity factor 562 of equation 1. The constraint based on the admissible noise 560 of Eq. 4 above can be relaxed according to Equation 6 as follows:

$$\overline{NC} - v_l \leq C^T C \hat{d}_c \leq \overline{NC} + v_r \qquad \text{Eq. 7}$$

Where $\hat{d}_c$ represents fractional values of the user category factor 510: $0 \leq C \hat{d}_c \leq 1$.

Based on the relaxed constraints, Equation 3 can be redefined according to Equation 8 as follows:

$$\max \frac{1}{2} \|W(C\hat{d}_c - \bar{d}_r)\|_2^2 \qquad \text{Eq. 8}$$

Based on the relaxed function of Equation 8, the first control unit 412 can proceed to the category optimization step 796 to generate the perturbed user information 218.

The category optimization step 796 is for generating the perturbed user information 218 based on the optimal value of the user category factor 510. The first control unit 412 can implement an iterative learning function to calculate the user category factor 510 based on relaxed constraints as defined by Equations 6-8 above. As an example the iterative learning function can be based on the augmented Lagrangian function 514 of FIG. 5 in Equation 9 as follows:

$$L(\hat{d}_c, v_l, v_r, x_i, y_i, \mu) = \frac{1}{2} \|W(C\hat{d}_c - \bar{d}_r)\|_2^2 - \sum_{i=1}^{5} h_i^T y_i + \frac{\mu}{2} \sum_{i=1}^{5} h_i^T h_i \qquad \text{Eq. 9}$$

Where "y" represents the Lagrange multiplier estimate, "h" represents the Lagrange constraint functions, and "u" is the initial estimate for the Lagrange function. The Lagrange constraint functions can be based on slack variables "$x_i$" for each of the above relaxed constraints of Equations 6 and 7. The Lagrange constraint functions can be defined by the following equations:

$$h_1 = -\|v_l + v_r\|_1 - x_1 + \frac{1}{2} \gamma \Delta f_L^* = 0 \qquad \text{Eq. 10}$$

$$h_2 = \overline{NC} + v_l - x_2 + C^T C \hat{d}_c = 0 \qquad \text{Eq. 11}$$

$$h_3 = \overline{NC} + v_r - x_3 - C^T C \hat{d}_c = 0 \qquad \text{Eq. 12}$$

$$h_4 = C \hat{d}_c - x_4 = 0 \qquad \text{Eq. 13}$$

$$h_5 = -C \hat{d}_c - x_5 + 1 = 0 \qquad \text{Eq. 14}$$

The first control unit 412 can implement the augmented Lagrangian function 514 for a predetermined number of iterations for each of the Lagrange constraint functions. Initially, the variables $\hat{d}_c$, $v_l$, $V_r$, $x_i$ can be randomly selected. For each subsequent iteration, the first control unit 412 can check for convergence of the augmented Lagrangian function 514. Convergence of the augmented Lagrangian function provides the perturbed user information 218 having the maximum distance from the raw user information 210. Once convergence has been reached, the first control unit 412 can determine the solution as the user category factor 510.

If no convergence has been reached, the first control unit 412 can update the values of $\hat{d}_c$, $v_l$, $v_r$, $x_i$ can be updated based on a gradient descent method and the Lagrange multiplier estimate "y" can be updated based on the Lagrange constraint functions.

After the predetermined number of iterations, if no convergence is reached, the first control unit 412 can determine that generation of the perturbed user information 218 is infeasible and the first control unit 412 can generate the notification stating that a solution is not possible with the information release setting 334, and information utility setting 222, or a combination thereof.

The information rounding step 798 is for rounding the fractional values of the user category factor 510 calculated in the category optimization step 796. For example, in the information rounding step 798, the first control unit 412 can implement a probabilistic approach to round the user category factor 510 to generate the perturbed user information 218 based on feasibility according to the noise parametric factors $v_l$ and $V_r$. In general, the first control unit 412 can round the fractional values of the user category factor 510 to the next whole number, such as to a value of "one" when the user category factor 510 value is greater than or equal to "one half". However, if rounding of the user category factor 510 value is not feasible, the first control unit 412 can minimize the infeasibility for the distance between $v_l$ and $v_r$. The distance between can be minimized by a function such as a greedy flip function.

It has been discovered that generating the perturbed user information 218 from the raw user information 210 eliminates the need for encryption or other security measure to protect the raw user information 210. The perturbed user information 218 has been generated to be maximally different from the raw user information 210 but preserve sufficient correlation to provide accurate recommendations and analysis based on the privacy release policy 340, which eliminates the need for additional security or protective measures, such as encryption.

Figure 8:
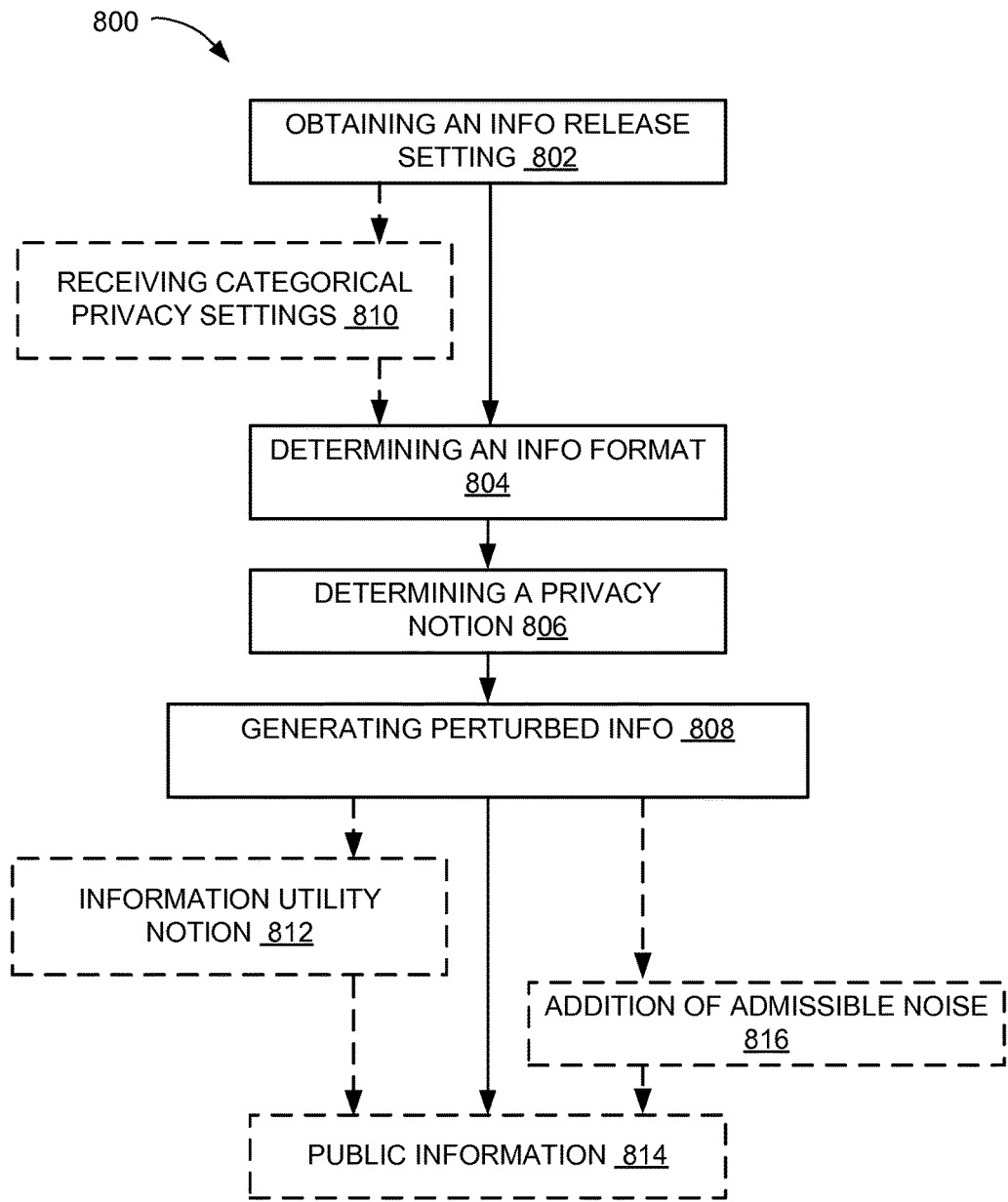
FIG. 8 is a flow chart of a method of operation of a computing system in an embodiment of the present invention.

Referring now to FIG. 8, therein is shown a flow chart of a method 800 of operation of a computing system 100 of FIG. 1 in a further embodiment. The exemplary flow chart 800 can include obtaining an information release setting for raw user information, the raw user information including an information attribute in a step 802. The computing system 100 can receive the information release setting of FIG. 3 as described above in the determining user requirements step 642 of FIG. 6.

Obtaining an information release setting can further include receiving an attribute based privacy settings for the information attribute of the raw user information in a step 810. The computing system 100 can receive the attribute based privacy settings 338 of FIG. 3 as described above in the determining user requirements step 642 of FIG. 6.

The exemplary flow chart 800 can include determining an information format for the information attribute of the raw user information in step 804. The computing system 100 can determine the information format 220 of FIG. 2 as described above the determining information format step 640 of FIG. 6.

The exemplary flow chart 800 can include determining a privacy notion based on the privacy setting in a step 806. The computing system 100 can determine the privacy notion 554 of FIG. 6 as described above in the determining privacy notion step 644.

The exemplary flow chart 800 can include generating perturbed user information from the information attribute based on the privacy notion, wherein the information format for the raw user information is preserved in the perturbed user information in step 808. The computing system 100 can generate the perturbed user information 218 of FIG. 2 as described above in the information perturbation step 650 of FIG. 6.

Generating perturbed user information can further include generating the perturbed user information to resemble public information based on a public category factor in step 812. Further, generating perturbed user information can include generating the perturbed user information based on an information utility notion for recommendation accuracy of the raw user information in step 814. Yet further, generating perturbed user information can further include generating the perturbed user information based on addition of admissible noise with a sensitivity factor in step 816.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   a memory comprising a plurality of instructions;
   a control unit, the control unit comprising at least one processor, wherein the plurality of instructions, when executed by the at least one processor, cause the at least one processor to:
      obtain an information release setting for a raw user information, wherein the raw user information includes an information attribute;
      obtain an information utility setting for containing a degree of modification to the raw user information;
      determine an information format for the raw user information;
      determine a privacy notion based on the information release setting;
      generate a perturbed user information by anonymizing the information attribute based on the privacy notion, wherein the perturbed user information modifies both content and quantity of data associated with the information attribute while maintaining the information format;
      determine whether the perturbed user information is convergent, wherein the perturbed user information is convergent when the perturbed user information is a predetermined distance from the raw user information, according to the information release setting and the information utility setting;
      in response to determining the perturbed user information is non-convergent, provide a notification that indicates that the perturbed user information is within the predetermined distance from the raw user information based on at least one of the information release setting or the information utility setting;
      identify trends within content of the raw user information and the information attribute; and generate noise that preserves the identified trends in the raw user information and the information attribute; and a communication unit, wherein the plurality of instructions, when executed by the at least one processor, cause the communication unit to transmit the perturbed user information after determining that perturbed user information is convergent.

2. The computing system as claimed in claim 1 further comprising a user interface, coupled to the control unit, configured to receive the information release setting including an attribute based privacy setting for the information attribute of the raw user information.

3. The computing system as claimed in claim 1 wherein the plurality of instructions when executed further cause the at least one processor to generate the perturbed user information that resembles public information based on a public category factor.

4. The computing system as claimed in claim 1 wherein the plurality of instructions when executed further cause the at least one processor to generate the perturbed user information based on an information utility notion for recommendation accuracy of the raw user information.

5. The computing system as claimed in claim 1 wherein the plurality of instructions when executed further cause the at least one processor to generate the perturbed user information that includes admissible noise with a sensitivity factor.

6. The computing system as claimed in claim 1 wherein the plurality of instructions when executed further cause the at least one processor to generate the perturbed user information that includes admissible noise based on an augmented Lagrange function.

7. The computing system as claimed in claim 1 wherein the plurality of instructions when executed further cause the at least one processor to:
identify the trends and
generate the noise while anonymizing the raw user information and the information attribute by adding and removing instances of the raw user information and the information attribute and altering the content associated with the raw user information and the information attribute.

8. The computing system as claimed in claim 1 wherein the plurality of instructions when executed further cause the at least one processor to generate the perturbed user information based on a differential privacy function.

9. The computing system as claimed in claim 1 wherein the plurality of instructions when executed further cause the at least one processor to determine the privacy notion based on information gain, or mutual information.

10. A method of operation of a computing system comprising:
obtaining an information release setting for a raw user information, wherein the raw user information includes an information attribute;
obtaining an information utility setting for containing a degree of modification to the raw user information;
determining an information format for the raw user information;
determining a privacy notion based on the information release setting;
generating a perturbed user information by anonymizing the information attribute based on the privacy notion, wherein the perturbed user information modifies both content and quantity of data associated with the information attribute while maintaining the information format;
determining whether the perturbed user information is convergent, wherein the perturbed user information is convergent when the perturbed user information is a predetermined distance from the raw user information, according to the information release setting and the information utility setting;
in response to determining the perturbed user information is non-convergent, providing a notification that indicates that the perturbed user information is within the predetermined distance from the raw user information based on at least one of the information release setting or the information utility setting;
identifying trends within content of the raw user information and the information attribute;
generating noise that preserves the identified trends in the raw user information and the information attribute; and
transmitting the perturbed user information after determining that perturbed user information is convergent.

11. The method as claimed in claim 10 wherein obtaining the information release setting comprises receiving an attribute based privacy setting for the information attribute of the raw user information.

12. The method as claimed in claim 10 wherein generating the perturbed user information includes generating the perturbed user information that resembles public information based on a public category factor.

13. The method as claimed in claim 10 wherein generating the perturbed user information comprises generating the perturbed user information based on an information utility notion for recommendation accuracy of the raw user information.

14. The method as claimed in claim 10 wherein generating the perturbed user information comprises generating the perturbed user information that includes admissible noise with a sensitivity factor.

15. A non-transitory computer readable medium embodying a computer program, the computer program comprising computer readable program code that, when executed by a processor of a computing system causes the computing system to:
obtain an information release setting for a raw user information, wherein the raw user information includes an information attribute;
obtain an information utility setting for containing a degree of modification to the raw user information;
determine an information format for the raw user information;
determine a privacy notion based on the information release setting;
generate a perturbed user information by anonymizing the information attribute based on the privacy notion, wherein the perturbed user information modifies both content and quantity of data associated with the information attribute while maintaining the information format;
determine whether the perturbed user information is convergent, wherein the perturbed user information is convergent when the perturbed user information is a predetermined distance from the raw user information, according to the information release setting and the information utility setting;
in response to determining the perturbed user information is non-convergent, provide a notification that indicates that the perturbed user information is within the predetermined distance from the raw user information based on at least one of the information release setting or the information utility setting;

identify trends within content of the raw user information and the information attribute;

generate noise that preserves the identified trends in the raw user information and the information attribute; and transmit the perturbed user information after determining that perturbed user information is convergent.

16. The non-transitory computer readable medium as claimed in claim 15 wherein to obtain the information release setting the computer readable program code when executed by the processor, further causes the computing system to receive an attribute based privacy setting for the information attribute of the raw user information.

17. The non-transitory computer readable medium as claimed in claim 15 wherein the computer readable program code when executed by the processor, further causes the computing system to generate the perturbed user information that resembles public information based on a public category factor.

18. The non-transitory computer readable medium as claimed in claim 15 wherein to generate the perturbed user information the computer readable program code when executed by the processor, further causes the computing system to generate the perturbed user information based on an information utility notion for recommendation accuracy of the raw user information.

19. The non-transitory computer readable medium as claimed in claim 15 wherein to generate the perturbed user information the computer readable program code when executed by the processor, further causes the computing system to generate the perturbed user information that includes admissible noise with a sensitivity factor.

20. The computing system as claimed in claim 1 wherein to determine the information format the plurality of instructions when executed further cause the at least one processor to identify a classification of the raw user information, and one or more categories associated with the information attribute.

* * * * *